United States Patent
Mitobe et al.

(10) Patent No.: US 9,884,641 B2
(45) Date of Patent: Feb. 6, 2018

(54) STEERING WHEEL

(71) Applicant: NIHON PLAST CO., LTD., Fujinomiya-shi, Shizuoka (JP)

(72) Inventors: Takashi Mitobe, Fujinomiya (JP); Yohei Kiuchi, Fujinomiya (JP); Ken Sasaki, Fujinomiya (JP)

(73) Assignee: NIHON PLAST CO., LTD., Fujinomiya-shi, Shizuoka (JP)

( * ) Notice: Subject to any disclaimer, the term of this patent is extended or adjusted under 35 U.S.C. 154(b) by 0 days.

(21) Appl. No.: 15/190,967

(22) Filed: Jun. 23, 2016

(65) Prior Publication Data

US 2017/0021854 A1    Jan. 26, 2017

(30) Foreign Application Priority Data

Jun. 25, 2015  (JP) ................................. 2015-127566

(51) Int. Cl.
| | | |
|---|---|---|
| *B62D 1/04* | (2006.01) | |
| *B62D 1/06* | (2006.01) | |
| *F16F 7/10* | (2006.01) | |
| *B06B 1/16* | (2006.01) | |

(52) U.S. Cl.
CPC ................ *B62D 1/06* (2013.01); *B06B 1/162* (2013.01); *B62D 1/046* (2013.01); *F16F 7/1011* (2013.01)

(58) Field of Classification Search
CPC ............ B62D 1/06; B62D 1/046; B06B 1/162
See application file for complete search history.

(56) References Cited

U.S. PATENT DOCUMENTS

| | | | | |
|---|---|---|---|---|
| 6,327,932 | B1 * | 12/2001 | Onodera | B60Q 1/0082 74/552 |
| 7,852,225 | B2 * | 12/2010 | Lemasson | B62D 1/046 340/407.1 |
| 8,421,289 | B2 * | 4/2013 | Hara | H02K 5/04 310/81 |
| 2005/0140503 | A1 * | 6/2005 | Murray | H02K 7/061 340/407.1 |
| 2016/0023677 | A1 * | 1/2016 | Sakurai | B62D 1/046 74/552 |

FOREIGN PATENT DOCUMENTS

| | | |
|---|---|---|
| DE | 202007014209 U1 | 4/2009 |
| DE | 102008036161 A1 | 2/2010 |

(Continued)

OTHER PUBLICATIONS

Extended European Search Report for EP App No. 16172640.1 dated Nov. 30, 2016.

(Continued)

*Primary Examiner* — Vicky A Johnson
(74) *Attorney, Agent, or Firm* — Procopio, Cory, Hargreaves & Savitch LLP (57) ABSTRACT

A steering wheel includes a ring-shaped rim is to be gripped by a driver (the rim includes a rim core and a rim molding portion covering the rim core), a boss disposed at the center of the rim, plural spokes connecting the rim with the boss, an arm whose base end portion is integrated with the rim core and that is extended toward the inside of the rim core in a cantilever manner, and a vibration generator attached to the arm for generating vibrations that are to be transmitted to the rim through the arm.

5 Claims, 9 Drawing Sheets

(56) References Cited

FOREIGN PATENT DOCUMENTS

| | | |
|---|---|---|
| EP | 0856432 A2 | 8/1998 |
| EP | 0958965 A2 | 7/2003 |
| GB | 433531 A | 8/1935 |
| JP | H07-10007 | 1/1995 |
| JP | 2009132359 A | 6/2009 |
| WO | 2008123804 A1 | 10/2008 |
| WO | 2011129747 A1 | 10/2011 |

OTHER PUBLICATIONS

Office Action for European Patent Application No. 16172640.1-1755 dated Oct. 6, 2017; 4 pages.

\* cited by examiner

STEERING WHEEL

CROSS REFERENCE TO RELATED APPLICATION

This application is based upon and claims the benefit of priority from Japanese patent application No. 2015-127566 filed on Jun. 25, 2015, the disclosure of which is incorporated herein in its entirety by reference.

BACKGROUND OF THE INVENTION

Technical Field

The present invention relates to a steering wheel provided with a vibration generator that vibrates a rim of the steering wheel.

Background Arts

Recently, as a safe driving support system for an automobile, known is a technology for providing a warning to a driver by generating a warning sound and vibrating a rim of a steering wheel when, for example, an automobile is going to move out from its own lane or is going to move into an opposite lane. By using such a safe driving support system, it becomes possible to obviate collisions of automobiles and so on.

Further, at present, it is also proposed to vibrate a rim of a steering wheel in order to provide various kinds of information (e.g. a running condition of an automobile) to a driver. Such a technology is being developed toward its practical use.

Figure 13:
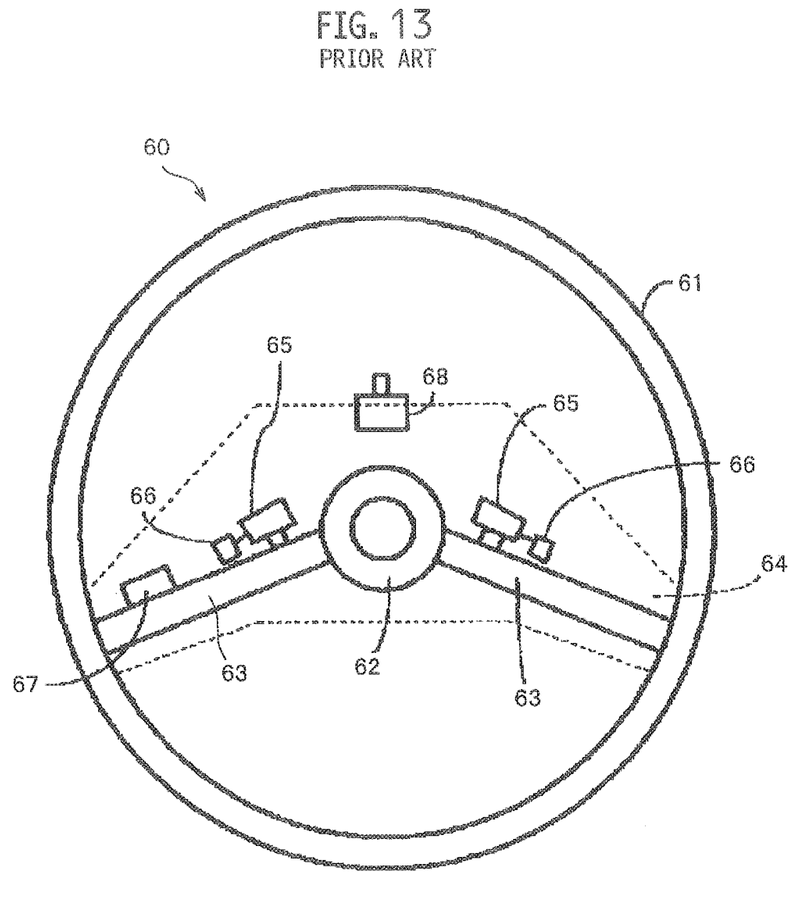
FIG. 13 is a front view of a prior-art steering wheel without a center pad and molded portions.

In addition, Japanese Unexamined Patent Application Publication No. H7-10007 (Patent Document 1) discloses a steering wheel whose rim is vibrated. As shown in FIG. 13, the steering wheel 60 disclosed in the Patent Document 1 includes a ring-shaped rim 61, a boss 62 disposed at the center of the rim 61, and left and right spokes 63 connecting the rim 61 with the boss 62. The boss 62 and the spokes 63 are usually covered by a pad 64 that is indicated by dotted lines.

A DC motor 65 is mounted on each of the spokes 63 behind the pad 64. An eccentric weight 66 is attached to a rotating shaft of the motor 65. Therefore, the motors 65 are vibrated when the eccentric weights 66 are rotated by passing electric currents from a power source to the motors 65. The vibrations of the motors 65 are transmitted to the rim 61 through the spokes 63, and thereby an entire of the rim 61 can be vibrated.

The steering wheel 60 disclosed in the Patent Document 1 also includes a current regulator 67 that regulates the electric currents passing to the motors 65, and a switch 68 that switches over whether or not to pass the electric currents to the current regulator 67. In this case, a driver can selectively pass the electric currents to the motors 65 by-bypassing or through the current regulator 67.

SUMMARY OF THE INVENTION

In a prior-art steering wheel in which vibrations can be transmitted to its rim as shown in the Patent Document 1, a vibration generator that includes a motor and an eccentric weight is fixed on a spoke(s) that connects the rim with a boss. However, since the vibration generator is fixed on the spoke(s), vibrations generated by the vibration generator are transmitted not only to the rim, but also to the boss.

Therefore, the vibrations generated by the vibration generator are dispersed to the rim and the boss, and thereby vibrations transmitted to the rim is subject to become weak. For this reason, in such a prior-art steering wheel, a large-sized vibration generator is fixed on a spoke(s), or a vibration generator is fixed on every spoke as shown in the above-mentioned Patent Document 1, in order to transmit vibrations to a rim surely.

Generally, performance of a vibration generator can be adjusted by a size and/or a shape of an eccentric weight. In a case of utilizing a large-sized vibration generator in order to get adequate vibrations as mentioned above, it is needed to improve durability of a motor and to increase an output power of a motor with respect to the eccentric weight according as a size and/or a shape of the eccentric weight is made larger. On the other hand, in a case of utilizing plural vibration generators in order to get adequate vibrations, it is needed to attach a motor and an eccentric weight of each of the plural vibration generators onto each spoke. Therefore, in both of the cases, a weight of a steering wheel is subject to become large, and a production cost of a steering wheel is subject to become high.

An object of the present invention is to provide a steering wheel that can transmit vibrations generated by a vibration generator to a rim efficiently, and thereby can reduce a weight and a production cost of the steering wheel.

An aspect of the present invention provides a steering wheel comprising: a ring-shaped rim that is to be gripped by a driver, the rim including a rim core and a rim molding portion that covers the rim core; a boss that is disposed at a center of the rim; a plurality of spokes that connect the rim with the boss; an arm whose base end portion is integrated with the rim core, and that is extended toward an inside of the rim core in a cantilever manner; and a vibration generator that is attached to the arm, and generates vibrations to be transmitted to the rim through the arm.

According to the aspect, the vibration generator is attached to the arm that is extended from the rim core in a cantilever manner. Therefore, vibrations generated by the vibration generator are not dispersed to the rim and the boss, but transmitted only to the rim. As the result, the vibrations generated by the vibration generator can be transmitted to an entire of the rim efficiently, and thereby a vibration effect by the vibration generator 15 can be exerted effectively.

It is preferable that the base end portion of the arm is integrally molded with the rim core by metal injection molding.

According to this configuration, it is possible to form the arm extended from the rim core easily and efficiently. In addition, it is possible to ensure strength of the arm with respect to the rim core stably.

It is preferable that the vibration generator includes an electric motor and an eccentric weight that is fixed firmly with a rotating shaft of the electric motor.

According to this configuration, it is possible to configure the vibration generator simply and at a low cost, and generate the vibrations to be transmitted to the rim stably.

It is preferable that the electric motor is attached to the arm by an attachment bracket, the attachment bracket includes a motor accommodating/holding portion that accommodates and holds the electric motor therein, a first fixing tab that is extended from one end of the motor accommodating/holding portion, and a second fixing tab that is extended from the other end of the motor accommodating/holding portion, the first fixing tab and the second fixing tab being extended so as to be overlapped with each other, the motor accommodating/holding portion includes an outer shell for covering the electric motor, and a plurality of support protrusions that are protruded from an inner circumferential surface of the outer shell for supporting and fixing the electric motor, and through holes are formed on the first fixing tab and the second fixing tab at positions that are associated with each other, and a bracket fixing member that fixes the attachment bracket to the arm is inserted through the through holes.

According to the attachment bracket, the attachment bracket can be attached to the arm by the bracket fixing member in a state where the electric motor is accommodated and held in the motor accommodating/holding portion. Therefore, it is possible to attach the electric motor to the arm easily and stably, and thereby the attached state of the electric motor can be maintained stably over a long time.

DESCRIPTION OF THE EMBODIMENTS

Hereinafter, embodiments will be described with reference to the drawings. Note that the present invention is not limited to the embodiments described below, and can have variants within a scope in which it includes a substantially identical configuration as that recited in the claim(s) and brings an equivalent advantage(s) to that brought by the configuration recited in the claim(s).

For example, a shape, a dimension, an appearance or the like of a steering wheel is not limited to that in the after-described embodiments, and may be modified arbitrarily. Although an arm to which a vibration generator is attached is extended upward from a lower end (i.e. from a 6-o'clock position of a rim toward the center of the rim), it is not limited to this configuration. The arm may be provided at another position on the rim as long as it is extended inward from the rim.

Note that, in the following descriptions, terms "vertical direction" and "lateral direction" indicate directions perpendicular to an axial direction of a steering shaft. Specifically, the vertical direction coincides with a vertical direction of a steering wheel when the steering wheel set at its neutral position is viewed from a driver (a direction defined by connecting between a 12-o'clock position and a 6-o'clock position on the rim in FIG. 1). Similarly, the lateral direction coincides with a lateral direction of a steering wheel when the steering wheel set at its neutral position is viewed from a driver (a direction defined by connecting between a 3-o'clock position and a 9-o'clock position on the rim in FIG. 1). In addition, terms "forward direction" and "backward direction" indicate directions parallel to an axial direction of a steering shaft. Specifically, the forward direction coincides with a direction getting away from a driver (a direction from a front face to a back face of the steering wheel). Similarly, the backward direction coincides with a direction getting closer to a driver (a direction from a back face to a front face of the steering wheel).

(First Embodiment)

Figure 1:
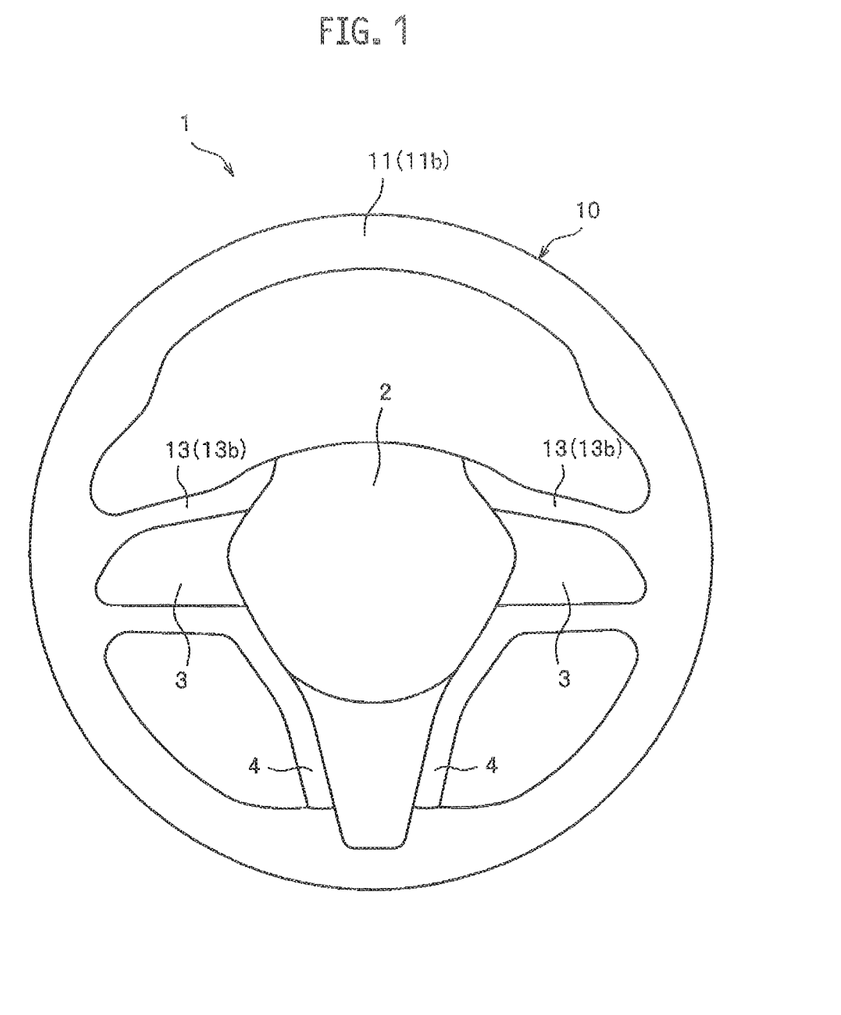
FIG. 1 is a front view of a steering wheel according to a first embodiment.

As shown in FIG. 1, a steering wheel 1 according to a first embodiment includes a main body 10, a center pad 2, finishers 3, a rear cover (not shown), and a vibration controller (not shown). The center pad 2 is disposed on a front-face side of the main body 10, and accommodates an airbag module therein. The finishers 3 are disposed on both left and right sides of the center pad 2 to cover a front face of the main body 10. The rear cover covers a rear face of the main body 10. The vibration controller controls operations of an after-described vibration generator 15 (see FIG. 2).

Figure 2:
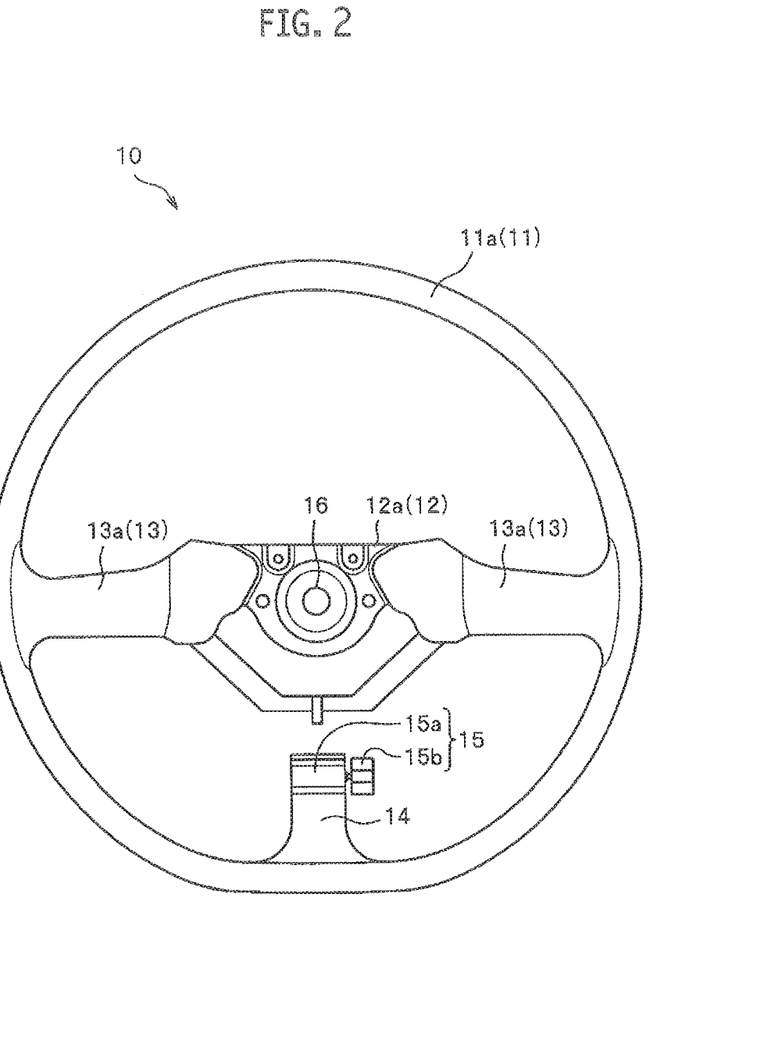
FIG. 2 is a front view of the steering wheel without a center pad and molded portions.

As shown in FIG. 2, the main body 10 includes a ring-shaped rim 11, a boss 12, spokes 13, an arm 14, and the vibration generator 15. The rim 11 is to be gripped by a driver. The boss 12 is disposed at the center of the rim 11. The spokes 13 connect the rim 11 with the boss 12. The arm 14 is extended upward from a lower end of the rim 11. The vibration generator 15 is attached to an open-end portion (an upper-end portion) of the arm 14.

The rim 11, the boss 12, and the spokes 13 include a rim core 11a, boss core 12a, spoke cores 13a, respectively. The cores 11a, 12a and 13a serve as core members (structural members), and are made from metal. In addition, a rim molded portion 11b that covers the rim core 11a, and spoke molded portions 13b that cover the spoke cores 13a are also provided. The molded portions 11b and 13b are made from synthetic resin such as urethane foam. Further, covers 4 are also provided so as to connect the left and right spoke molded portions 13b with the lower end (6-o'clock position) of the rim 11. The covers 4 are disposed between the center pad 2 and the rear cover (not shown).

The spoke cores 13a connect the boss core 12a with left and right side inner edges (portions at the 9-o'clock and 3-o'clock positions) of the rim core 11a. According to this structure, appropriate strength can be given to the steering wheel 1. In addition, no spoke core 13a is provided at the lower end of the rim core 11a, so that an installation space for the arm 14 can be ensured at the lower end of the rim core 11a with no obstacle.

Note that an additional spoke core 13a may be provided independently from the arm 14 so as to connect the boss core 12a with the lower end (6-o'clock position) of the rim core 11a. In addition, leather-wrapping and/or decoration may be made on the rim molded portion 11b in order to improve appearance of the steering wheel 1.

A shaft connection portion 16 with which an upper end of a steering shaft is fixed is formed on the boss 12. Module attachment portions (not shown) to which the airbag module (the center pad 2 is attached thereto) is attached, finisher attachment portions (not shown) to which the finishers 3 are attached and so on are also formed on the boss 12.

The rim core 11a has an almost U-shaped cross-sectional shape, and its outer surface is covered by the rim molded portion 11b. The arm 14 is extended from the lower end (6-o'clock position) of the ring-shaped rim core 11a toward the boss core 12a.

The arm 14, the rim core 11a, the boss core 12a, and the spoke cores 13a are made from an identical metallic material (e.g. magnesium alloy), and formed integrally with each other by casting, metal injection molding and so on. In addition, a base end portion 14a of the arm 14 (see FIG. 3) is connected with the rim core 11a, and is partially covered by the rim molded portion 11b. The base end portion 14a of the arm 14 is formed integrally with the rim core 11a. Namely, the base end portion 14a of the arm 14 is integrally molded with the rim core 11a by metal injection molding.

Figure 3:
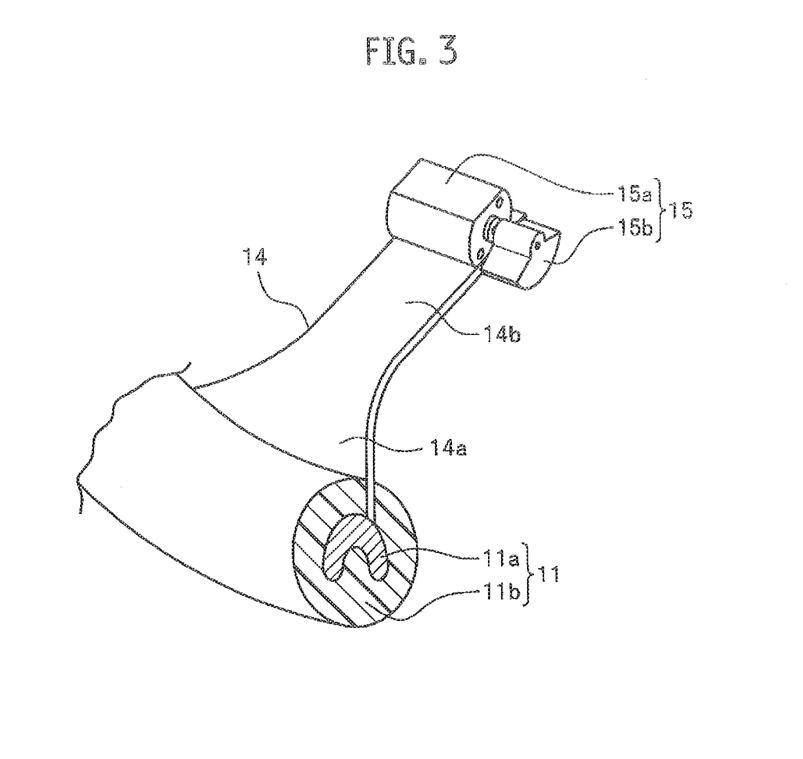
FIG. 3 is an enlarged perspective view (partially cross-sectioned) showing a featured portion of the steering wheel.

As shown in FIG. 3, the arm 14 is formed to have a plate shape having a constant thickness. One end of the arm 14 is connected with the rim core 11a, and the other end forms a free end as a cantilever. The arm 14 includes the base end portion 14a and a tab portion 14b extended from the base end portion 14a. A width of the base end portion 14a is gradually narrowed toward the tab portion 14b. A width of the tab portion 14b is made constant. A distal end of the tab portion 14b is the free end of the arm 14.

Note that vibrations transmitted to the rim 11 can be easily adjusted by varying a shape and/or a size of the arm 14 (e.g. a ratio of the widths of the base end portion 14a and the tab portion 14b to an extended length of the arm 14 from the rim core 11a).

Therefore, in a case of forming an arm 14 on a steering wheel 1 having various shapes and/or various sizes, a shape and/or a size of the arm 14 can be changed arbitrarily according to the various shapes and/or the various sizes of the steering wheel 1 so as to transmit vibrations generated by its vibration generator 15 to its rim 11 appropriately.

The vibration generator 15 is attached to the free end (distal end) of the arm 14. The vibration generator 15 according to the present embodiment includes a small-sized electric motor 15a and an eccentric weight (mass) 15b. The electric motor 15a is fixed firmly on a surface of the arm 14 with an adhesive agent. The eccentric weight 15b is fixed firmly with a rotating shaft of the electric motor 15a. The vibration generator 15 is configured as a so-called unbalanced-mass type vibrator which is low-cost and has a simple structure.

The electric motor 15a and the eccentric weight 15b are formed basically identical to a prior-art electric motor and a prior-art eccentric weight that are commonly used, respectively. The arm 14 and the vibration generator 15 are hidden so as to be covered by the center pad 2 (the airbag module), the left and right covers 4 and the rear cover (not shown) when the center pad 2 (the airbag module) and the rear cover (not shown) are attached to the main body 10, and thereby the vibration generator 15 cannot be viewed from outside.

The electric motor 15a is disposed so that its rotating shaft with which the eccentric weight 15b is fixed firmly is extended in a direction perpendicular to the extended direction of the arm 14 from the rim core 11a. However, the attaching orientation of the electric motor 15a is not limited to this. For example, the electric motor 15a may be installed on the arm 14 so as to extend the rotating shaft parallel to the extended direction of the arm 14 from the rim core 11a.

A fixing means of the electric motor 15a onto the arm 14 is not limited to that in the present embodiment. Other than an adhesive means such as the above-mentioned adhesive agent, a welding means may be used as the fixing means in order to fix the electric motor 15a with the arm 14. Otherwise, as in an after-described second embodiment, the electric motor 15a may be mechanically fixed onto the arm 14 by an attachment bracket 21 (see FIG. 7 and FIG. 8) and so on.

Other than the above-mentioned unbalanced-mass type vibrator, other types of vibrator may be used as the vibration generator 15. For example, an electrically-driven type vibrator that generates vibrations by passing an electric current through a coil disposed in a magnetic field may be adopted as the vibration generator 15.

Operations of the electric motor 15a is controlled by the vibration controller (not shown). The vibration controller is electrically connected with the electric motor 15a, and is configured to rotationally drive the electric motor 15a by passing an electric current to the electric motor 15a in a case where a predetermined state or condition is detected, for example, when an automobile is going to move out from its own lane, when a running speed of an automobile excesses over a predetermined value, or the like.

According to the steering wheel 1 in the present embodiment, it is possible to generate vibrations by the vibration generator 15 by passing an electric current to the electric motor 15a when the vibration controller detects the predetermined state or condition to rotate the eccentric weight 15b fixed with the rotating shaft of the electric motor 15a.

Since the vibration generator 15 is fixed at the free end of the cantilever arm 14, it is possible to transmit the vibrations generated by the small-sized electric motor 15a to an entire of the rim 11 through the arm 14 and the rim core 11a. As the result, a vibration effect by the vibration generator 15 can be exerted effectively. Therefore, even when the vibration generator 15 is small-sized as described above, it is possible to provide a warning to a driver who holds the rim 11 surely by vibrating the rim 11 adequately.

In other words, according to the steering wheel 1 in the present embodiment, by providing the single small-sized vibration generator 15 on the free end of the arm 14, the vibration generator 15 can generate vibrations equivalent to vibrations generated by the above-mentioned prior-art ways, i.e. by providing plural vibration generators on a spoke(s) or by using a large-sized vibration generator that includes a large eccentric weight and a high-power motor. As the result, an entire of the rim 11 can be vibrated adequately and effectively by the single small-sized vibration generator 15.

Note that the arm 14 in the present embodiment is formed integrally with the rim core 11a by casting, metal injection molding and so on, and extended from the rim core 11a toward the boss 12 relatively longwise, as described above. However, configuration of the arm 14 is not limited to this. For example, as a modified example shown in FIG. 4, an arm 14' with which the vibration generator 15 may be integrally fixed with a rim core 11a' of a rim 11' mechanically by an arm fixing member(s) 17 such as a bolt(s) or a screw(s).

Figure 4:
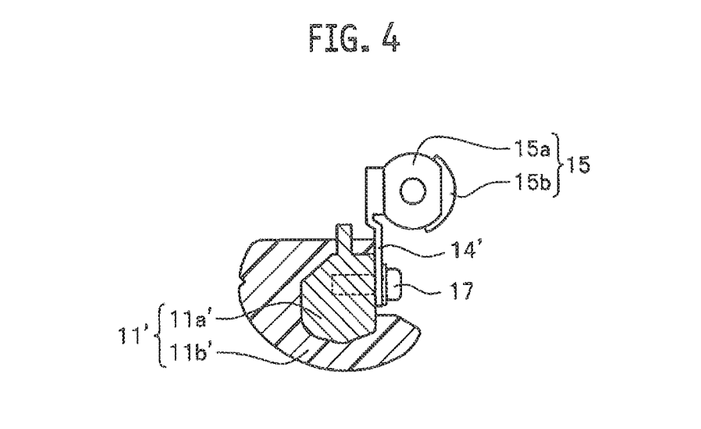
FIG. 4 is an enlarged side view (partially cross-sectioned) showing a featured portion of a steering wheel according to a modified example.

In this case, the rim core 11a' is covered by a rim molded portion 11b' made from synthetic resin, but a fixture portion between the rim core 11a' and the arm 14' is not covered by the rim molded portion 11b', i.e. the fixture portion is exposed. However, the fixture portion may be covered by the rear cover, or by the covers 4.

In the modified example shown in FIG. 4, an extended length of the arm 14' from the rim core 11a' is made shorter than that in the above-described first embodiment so that the vibration generator 15 is disposed closer to the rim core 11a'. The vibration generator 15 may be fixed on any one of a first (front) surface of the arm 14' or a second (rear) surface that is an opposite surface to the first surface.

Figure 5:
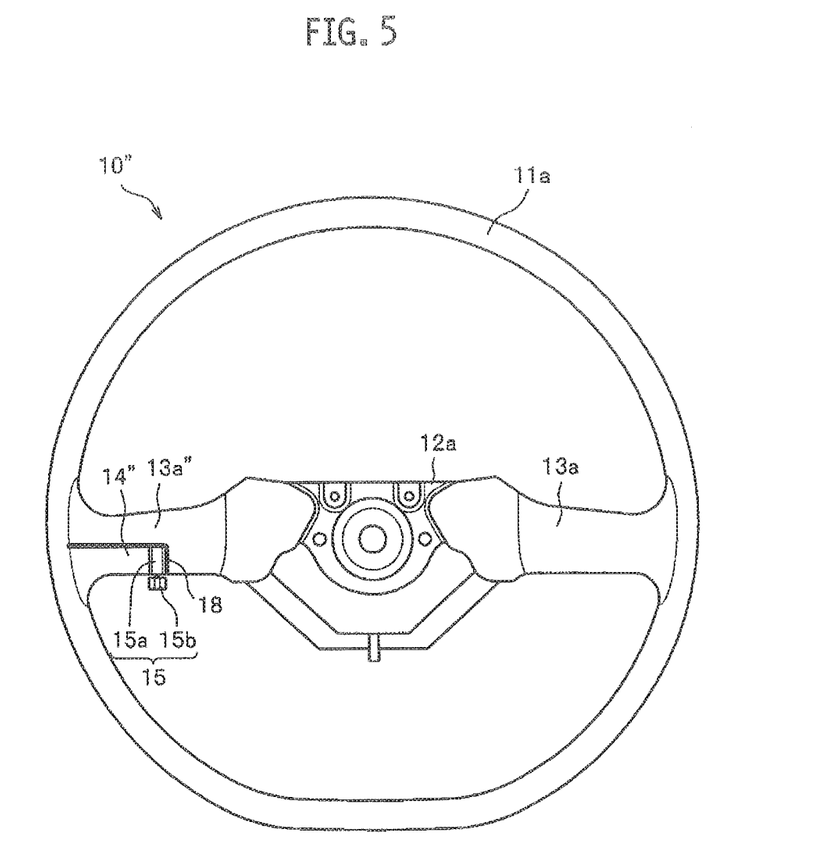
FIG. 5 is a front view of a steering wheel without a center pad and molded portions according to another modified example.

In a main body 10" of a steering wheel according to another modified example shown in FIG. 5, a left-side spoke core 13a" is formed by cutting (making thinner) a portion of the left-side spoke core 13a of the above-described first embodiment to form a recess 18. An arm 14" with which the vibration generator 15 is fixed may be disposed in the recess 18 so as to be extended from the rim core 11a. In other words, it is possible to form the left-side spoke core 13a" and the arm 14" independently from each other by forming the recess 18 on the left-side spoke core 13a of the first embodiment.

A size of the vibration generator 15 in this other modified example is made smaller than that in the first embodiment, but includes the electric motor 15a and the eccentric weight 15b similarly to those in the first embodiment. The rim core 11a, the boss core 12a and the right-side spoke core 13a are formed identically to those in the first embodiment.

By forming the arm 14" as in this other modified example, design flexibility of the steering wheel can be improved by diminishing restriction of an installation space for the arm 14" in addition to the efficient transmission of the vibrations generated by the vibration generator 15 to the rim 11.

(Second Embodiment)

A steering wheel according to a second embodiment is different from the steering wheel 1 according to the above-described first embodiment only in configurations of an arm 24 extended from the rim core 11a and an attachment bracket 21 for attaching the vibration generator 15 to the arm 24. Other configurations of the steering wheel according to the second embodiment are substantially equivalent to those of the steering wheel 1 according to the above-described first embodiment.

Therefore, in the second embodiment (and also in after-described third and fourth embodiments), portions and members having substantially equivalent configurations to those of the steering wheel 1 according to the first embodiment will be labelled with identical reference numbers to those in the first embodiment, and their detailed descriptions will be omitted.

Figure 6:
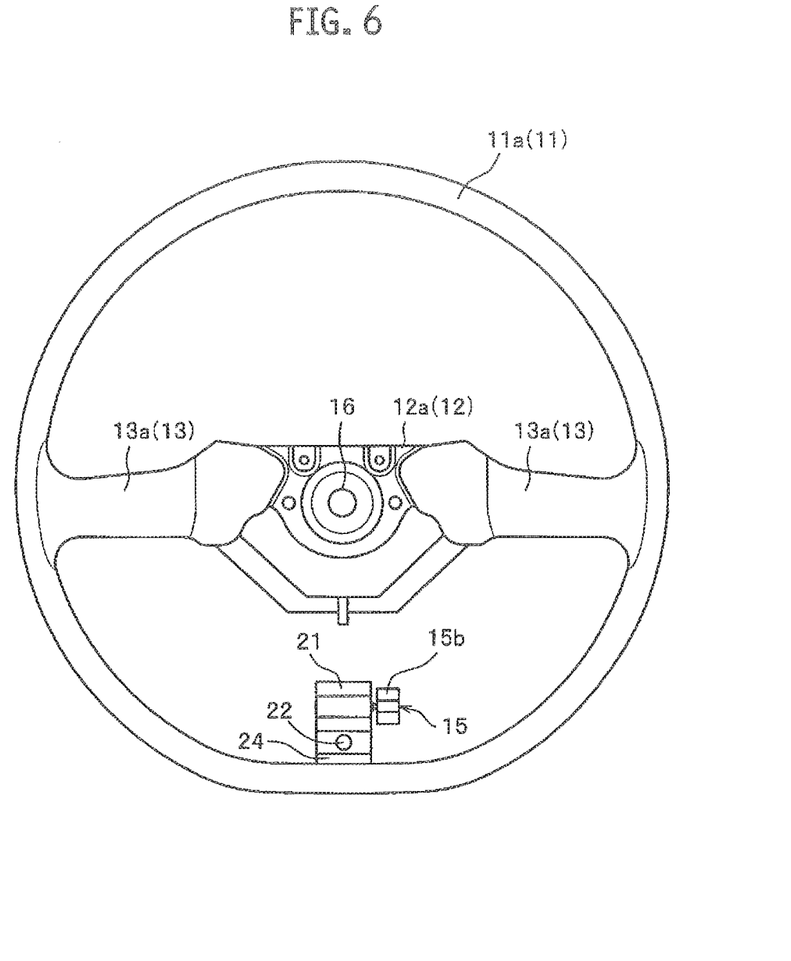
FIG. 6 is a front view of a steering wheel without a center pad and molded portions according to a second embodiment.

As shown in FIG. 6, the arm 24 in the present embodiment is extended from the lower end (6-o'clock position) of the rim core 11a toward the boss core 12a. The arm 24 is formed integrally with the rim core 11a by casting, metal injection molding and so on. One end of the arm 24 is connected with the rim core 11a, and the other end thereof forms a free end as a cantilever.

A width of the arm 24 is made constant from the one end (a connected portion with the rim core 11a) to the other end (distal end, free end). An attachment hole 24a to which an after-described bracket fixing member (screw) 22 can be fastened is formed at the middle of the arm 24.

The vibration generator 15 that is attached to arm 24 has the same configuration as that of the vibration generator 15 of the first embodiment to include the small-sized electric motor 15a and the eccentric weight 15b fixed firmly on the rotating shaft of the electric motor 15a. The electric motor 15a of the vibration generator 15 is fixed with the arm 24 by use of the attachment bracket 21.

Figure 7:
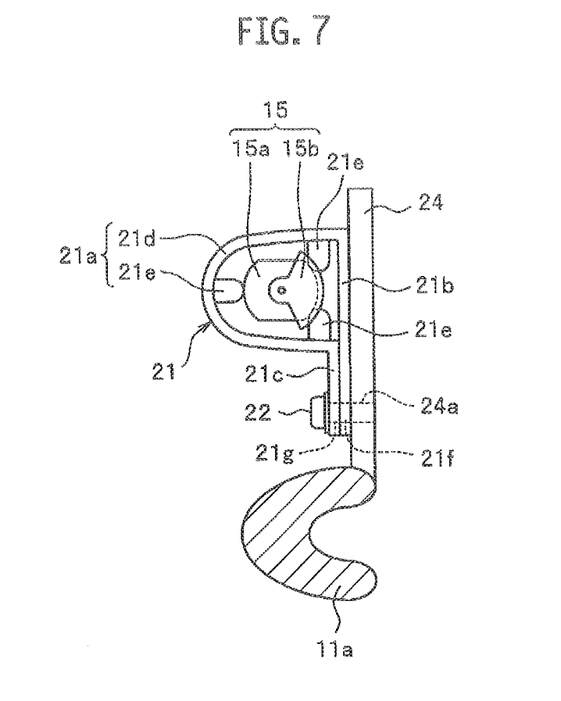
FIG. 7 is an enlarged side view (partially cross-sectioned) showing a featured portion of the steering wheel.
Figure 8:
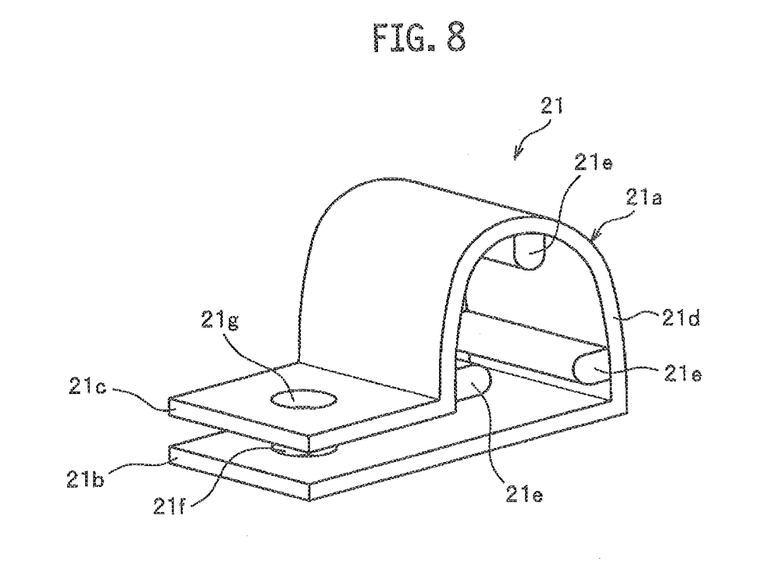
FIG. 8 is a perspective view showing an attachment bracket of the steering wheel.

The attachment bracket 21 is made from a metallic material, and has an elastic deformability to some degree. As shown in FIG. 7 and FIG. 8, the attachment bracket 21 includes a motor accommodating/holding portion 21a, a first fixing tab 21b and a second fixing tab 21c. The motor accommodating/holding portion 21a accommodates and fixes (holds) the electric motor 15a therein. The first fixing tab 21b has a flat plate shape, and is extended from one end (a first end) of the motor accommodating/holding portion 21a on a far side from the rim core 11a. The second fixing tab 21c also has a flat plate shape, and is extended from the other end (a second end) of the motor accommodating/holding portion 21a on a close side to the rim core 11a.

The motor accommodating/holding portion 21a, the first fixing tab 21b and the second fixing tab 21c have identical widths to each other. The widths of the motor accommodating/holding portion 21a, the first fixing tab 21b and the second fixing tab 21c are made equal to the width of the arm 24, or made smaller than the width of the arm 24.

The motor accommodating/holding portion 21a has an outer shell 21d that covers around the electric motor 15a, and three support protrusions 21e that are protruded from an inner circumferential surface of the outer shell 21d. The outer shell 21d is curved to have a U-shaped side view, and has a size that is associated with a shape and a size of the electric motor 15a accommodated in the motor accommodating/holding portion 21a.

The support protrusions 21e of the motor accommodating/holding portion 21a are protruded inward from the outer shell 21d at a position near the first end of the outer shell 21d, at a position farthest from the first fixing tab 21b, and at a position near the second end of the outer shell 21d. Each of the support protrusions 21e is disposed parallel to a width direction of the arm 24 so as to be extended along an entire width of the outer shell 21d. The electric motor 15a is supported by three positions of top ridges of the three support protrusions 21e when it is held in the motor accommodating/holding portion 21a.

The first fixing tab 21b is extended straight from the first end of the motor accommodating/holding portion 21a so as to form a bent portion therebetween. A circular first through hole 21f for inserting the bracket fixing member (screw) 22 therethrough is formed at a distal end (free end) portion of the first fixing tab 21b so as to be perpendicular to front and back surfaces of the first fixing tab 21b. In addition, a length of the first fixing tab 21b (along the extended direction of the arm 24) is made shorter than a length of the arm 24.

The second fixing tab 21c is extended straight from the second end of the motor accommodating/holding portion 21a so as to form a bent portion therebetween. A circular second through hole 21g for inserting the bracket fixing member (screw) 22 therethrough is formed at a distal end (free end) portion of the second fixing tab 21c so as to be perpendicular to front and back surfaces of the second fixing tab 21c.

The first fixing tab 21b and the second fixing tab 21c are (partially) overlapped with each other, and the second through hole 21g is formed at a position that is associated with a position of the first through hole 21f in a state where the electric motor 15a is accommodated in the motor accommodating/holding portion 21a.

When attaching the electric motor 15a to the arm 24 by use of the attachment bracket 21 having the above configurations, the motor accommodating/holding portion 21a is slightly deformed to form a small gap between the first fixing tab 21b and the second fixing tab 21c, and then the electric motor 15a is inserted into the motor accommodating/holding portion 21a from a side of the attachment bracket 21. Subsequently, the attachment bracket 21 that loosely holds the electric motor 15a is set on the arm 24.

A position and an orientation of the electric motor 15a loosely held in the motor accommodating/holding portion 21a is adjusted so as to be supported by the support protrusions 21e in a well-balanced manner. In addition, when setting the attachment bracket 21 on the arm 24, an entire back surface of the first fixing tab 21b contacts with the arm 24 to be supported, and a position of the attachment bracket 21 is aligned with respect to the arm 24 so as to match a position of the first through hole 21f with a position of the attachment hole 24a.

Subsequently, the second fixing tab 21c is aligned with respect to the first fixing tab 21b so as to match a position of the second through hole 21g with a position of the first through hole 21f.

Then, the bracket fixing member (screw) 22 is fastened into the attachment hole 24a through the first through hole 21f and the second through hole 21g. As the result, the electric motor 15a of the vibration generator 15 is fixed firmly with the arm 24 by the attachment bracket 21 in a state where it is held in the motor accommodating/holding portion 21a by the three support protrusions 21e.

When the vibration generator 15 is controlled by the vibration controller to generate vibrations, the vibrations generated by the vibration generator 15 can be transmitted to the rim 11 efficiently through the attachment bracket 21 and the arm 24. Therefore, the vibration effect by the vibration generator 15 can be exerted effectively according to the steering wheel of the present embodiment, similarly to the above-described steering wheel 1 of the first embodiment.

(Third Embodiment)

In a steering wheel according to a third embodiment, the electric motor 15a of the vibration generator 15 is attached to an arm 34 extended from the rim core 11a, not by using an adhesive agent as in the above-described first embodiment, but by providing a structure for snapping the electric motor 15a on the arm 34. Other configurations of the steering wheel according to the third embodiment are substantially equivalent to those of the steering wheel 1 according to the above-described first embodiment.

Figure 9:
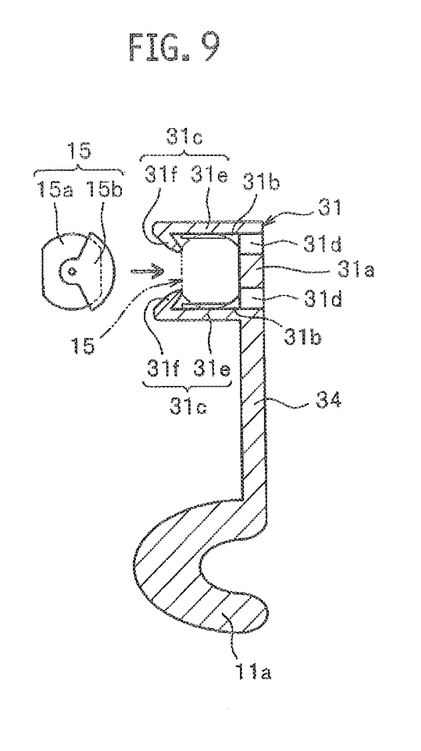
FIG. 9 is a cross-sectional view showing a featured portion of a steering wheel according to a third embodiment.
Figure 10:
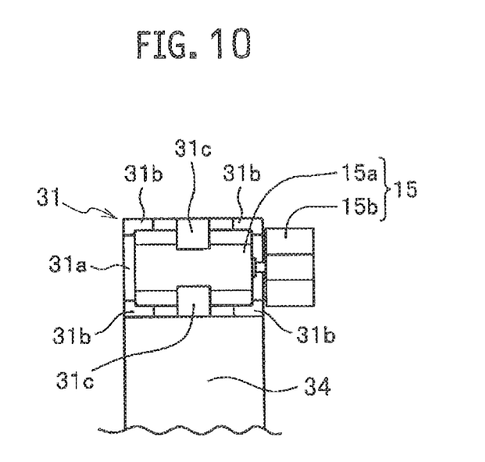
FIG. 10 is a front view showing the featured portion.

As shown in FIG. 9 and FIG. 10, the arm 34 in the present embodiment is extended from the lower end (6-o'clock position) of the rim core 11a toward the boss core 12a, and has a constant width. The arm 34 is formed integrally with the rim core 11a by casting, metal injection molding and so on. One end of the arm 34 is connected with the rim core 11a, and the other end thereof forms a free end as a cantilever. In addition, a motor snap-on/accommodation portion 31 for fixing the electric motor 15a by snapping it thereon is provided at the free end of the arm 34.

The motor snap-on/accommodation portion 31 includes a bottom plate 31a, four position restriction walls 31b, and a pair of engagement barbed tabs 31c. The bottom plate 31a has an almost rectangular shape, and supports a bottom surface of the electric motor 15a. The position restriction walls 31b are raised from four corners of the bottom plate 31a so as to extend along an outline of the electric motor 15a, and restrict a position of the electric motor 15a. The pair of engagement barbed tabs 31c is raised from the middle of the bottom plate 31a in a width direction of the arm 34, and engages (holds) the electric motor 15a.

Through holes 31d are formed beside the engagement barbed tabs 31c on the bottom plate 31a. The Through holes 31d are formed in order to form an after-described pawl-shaped engagement heads 31f that are under-cut portions when molding the motor snap-on/accommodation portion 31 (the arm 34). Sliding blocks of a molding die are used for forming the under-cut portions, and the through holes 31d are formed by the sliding blocks. When viewing from a snap-on direction of the electric motor 15a, the four position restriction walls 31b hold four corners of a main body of the electric motor 15a from the outside to hold the electric motor 15a at its appropriate position.

Each height of the position restriction walls 31b from the bottom plate 31a is made smaller than each height of the engagement barbed tabs 31c. Each of the engagement barbed tabs 31c has a pillar 31e extended from the bottom plate 31a, and an engagement head 31f that is formed at the top end of the pillar 31e to have a pawl shape.

When attaching the electric motor 15a to the motor snap-on/accommodation portion 31, the electric motor 15a is inserted into the motor snap-on/accommodation portion 31 from an open side of the motor snap-on/accommodation portion 31 (a top side opposite to the bottom plate 31a) as shown in FIG. 9. The engagement barbed tabs 31c (the pillars 31e) are elastically deformed outward, so that the electric motor 15a can be smoothly inserted into the inside of the four position restriction walls 31b. The engagement barbed tabs 31c (the pillars 31e) elastically return back after the electric motor 15a is accommodated in the inside of the four position restriction walls 31b, and then the electric motor 15a is engaged by the engagement heads 31f. As the result, the electric motor 15a is firmly fixed in the motor snap-on/accommodation portion 31.

According to the steering wheel in the present embodiment in which the electric motor 15a of the vibration generator 15 is fixed with the motor snap-on/accommodation portion 31 provided on the cantilever arm 34, the vibrations generated by the vibration generator 15 can be transmitted to the rim 11 efficiently, similarly to the steering wheel 1 of the above-described first embodiment. Therefore, the vibration effect by the vibration generator 15 can be exerted effectively according to the steering wheel of the present embodiment, similarly to the above-described steering wheel 1 of the first embodiment.

(Fourth Embodiment)

In a steering wheel according to a fourth embodiment, the electric motor 15a of the vibration generator 15 is attached to an arm 44 by using motor fixing members (screws) 42 with a motor fixing wall 41a provided on the arm 44. Other configurations of the steering wheel according to the third embodiment are substantially equivalent to those of the steering wheel 1 according to the above-described first embodiment.

Figure 11:
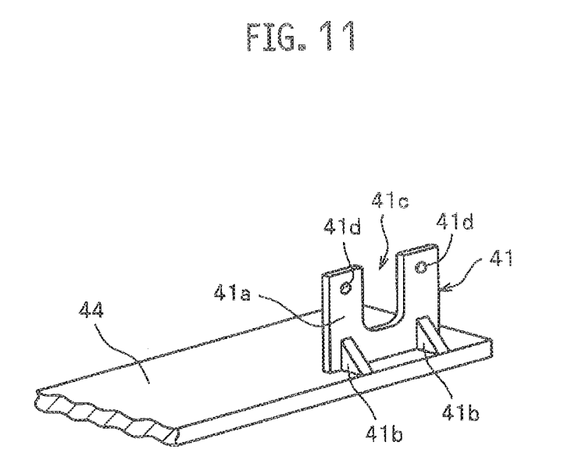
FIG. 11 is a perspective view showing a featured portion of a steering wheel according to a fourth embodiment.
Figure 12:
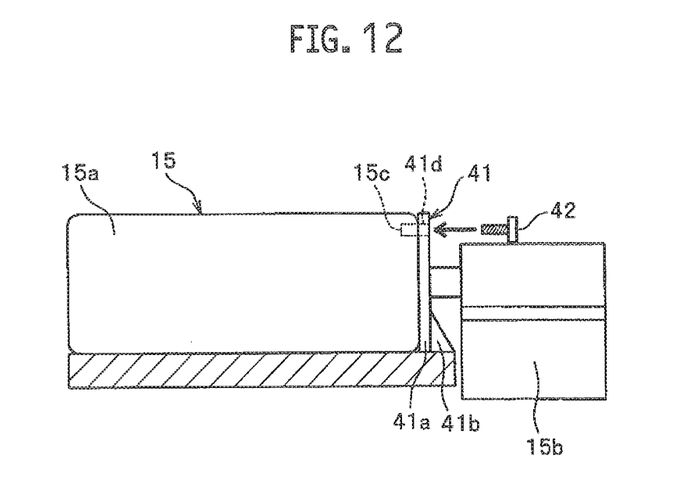
FIG. 12 is a side view showing the featured portion.

As shown in FIG. 11 and FIG. 12, the arm 44 in the present embodiment is extended from the lower end (6-o'clock position) of the rim core 11a toward the boss core 12a, and has a constant width. The arm 44 is formed integrally with the rim core 11a by casting, metal injection molding and so on. One end of the arm 44 is connected with the rim core 11a, and the other end thereof forms a free end as a cantilever. In addition, a motor fixing portion 41 for fixing the electric motor 15a is provided at the free end of the arm 44.

The motor fixing portion 41 includes the motor fixing wall 41a, and two reinforcing ribs 41b. The motor fixing wall 41a is raised from the arm 44 to be extended along a longitudinal direction of the arm 44, and has a constant wall thickness. The reinforcing ribs 41b reinforce the motor fixing wall 41a. An insertion slot 41c is formed on the motor fixing wall 41a, and a portion near the rotating shaft of the electric motor 15a is set onto the insertion slot 41c. The motor fixing wall 41a has an almost U-shape due to the formation of the insertion slot 41c.

Two through holes 41d are formed at top ends of the motor fixing wall 41a, and the motor fixing members (screws) 42 are inserted into the through holes 41d. Two attachment holes 15c to which an the screws 42 can be fastened are also formed on a main body of the electric motor 15a at positions associated with the through holes 41d.

When attaching the electric motor 15a to the motor fixing portion 41, the electric motor 15a is set at the free end of the arm 44 and an end face of the electric motor 15a from which the rotating shaft is extended out is contacted with the motor fixing wall 41a as shown in FIG. 12. Then, the motor fixing members (screws) 42 are fastened into the attachment holes 15c of the electric motor 15a through the through holes 41d. As the result, the electric motor 15a is fixed with the free end of the arm 44 firmly in a state where the electric motor 15a is contacted with the surface of the arm 44 and the wall surface of the motor fixing wall 41a.

According to the steering wheel in the present embodiment in which the electric motor 15a of the vibration generator 15 is fixed with the motor fixing portion 41 provided on the cantilever arm 44, the vibrations generated by the vibration generator 15 can be transmitted to the rim 11 efficiently, similarly to the steering wheel 1 of the above-described first embodiment. Therefore, the vibration effect by the vibration generator 15 can be exerted effectively according to the steering wheel of the present embodiment, similarly to the above-described steering wheel 1 of the first embodiment.

The present invention is not limited to the above-mentioned embodiment, and it is possible to embody the present invention by modifying its components in a range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment.

The present application claims the benefit of a priority under 35 U.S.C. §119 to Japanese Patent Application No. 2015-127566, filed on Jun. 25, 2015, the entire content of which is incorporated herein by reference.

What is claimed is:

1. A steering wheel comprising:
a ring-shaped rim that is to be gripped by a driver, the rim including a rim core and a rim molding portion that covers the rim core;
a boss that is disposed at a center of the rim;
a plurality of spokes that connect the rim with the boss;
an arm whose base end portion is integrated with the rim core, and that is extended toward an inside of the rim core in a cantilever manner, wherein the arm is not connected to the boss and the plurality of spokes; and
a vibration generator that is attached to the arm, and generates vibrations to be transmitted to the rim through the arm that is not connected to the boss and the plurality of spokes.

2. The steering wheel according to claim 1, wherein the base end portion of the arm is integrally molded with the rim core by metal injection molding.

3. The steering wheel according to claim 1, wherein the vibration generator includes an electric motor and an eccentric weight that is fixed firmly with a rotating shaft of the electric motor.

4. The steering wheel according to claim 3, wherein the electric motor is attached to the arm by an attachment bracket,
the attachment bracket includes a motor accommodating/holding portion that accommodates and holds the electric motor therein, a first fixing tab that is extended from one end of the motor accommodating/holding portion, and a second fixing tab that is extended from the other end of the motor accommodating/holding portion, the first fixing tab and the second fixing tab being extended so as to be overlapped with each other,
the motor accommodating/holding portion includes an outer shell for covering the electric motor, and a plurality of support protrusions that are protruded from an inner circumferential surface of the outer shell for supporting and fixing the electric motor, and
through holes are formed on the first fixing tab and the second fixing tab at positions that are associated with each other, and a bracket fixing member that fixes the attachment bracket to the arm is inserted through the through holes.

5. The steering wheel according to claim 3, further comprising a snap-on portion configured for retaining the electric motor of the vibration generator on the arm.

* * * * *